US008111170B2

(12) United States Patent
Wilson et al.

(10) Patent No.: US 8,111,170 B2
(45) Date of Patent: Feb. 7, 2012

(54) REMOTE AREA SENSOR SYSTEM

(75) Inventors: James Nicholas Wilson, Emsworth (GB); Eric Atherton, Witney (GB)

(73) Assignee: Wireless Measurement Limited, Emsworth (GB)

( * ) Notice: Subject to any disclaimer, the term of this patent is extended or adjusted under 35 U.S.C. 154(b) by 815 days.

(21) Appl. No.: 12/162,450

(22) PCT Filed: Jan. 26, 2007

(86) PCT No.: PCT/GB2007/000275
§ 371 (c)(1),
(2), (4) Date: Jul. 28, 2008

(87) PCT Pub. No.: WO2007/085850
PCT Pub. Date: Aug. 2, 2007

(65) Prior Publication Data
US 2009/0027227 A1 Jan. 29, 2009

(51) Int. Cl.
*G08B 1/08* (2006.01)
(52) U.S. Cl. .................................. 340/853.2; 702/189
(58) Field of Classification Search ............... 340/853.2; 702/188, 189
See application file for complete search history.

(56) References Cited

U.S. PATENT DOCUMENTS

| 6,150,955 A | 11/2000 | Tracy et al. |
| 6,731,223 B1 | 5/2004 | Partyka ................ 340/870.15 |
| 7,242,294 B2 * | 7/2007 | Warrior et al. ............ 340/539.22 |
| 2003/0063585 A1 | 4/2003 | Younis et al. ................ 370/331 |
| 2005/0206530 A1 | 9/2005 | Cumming et al. |
| 2007/0276600 A1 * | 11/2007 | King et al. ................ 701/301 |
| 2009/0154343 A1 * | 6/2009 | Fitch et al. ................ 370/221 |

FOREIGN PATENT DOCUMENTS

| EP | 1 517 493 | 8/2007 |
| GB | 2236642 A | 4/1991 |
| GB | 2353546 A | 2/2001 |
| GB | 2335523 A | 5/2002 |
| WO | 99/17477 A2 | 4/1999 |
| WO | 02/30140 A2 | 4/2002 |
| WO | WO 03/090411 | 10/2003 |

OTHER PUBLICATIONS

UK Search Report, May 22, 2006.

* cited by examiner

*Primary Examiner* — William P Neuder
(74) *Attorney, Agent, or Firm* — Z. Peter Sawicki; Westman, Champlin & Kelly P.A.

(57) ABSTRACT

A communications system comprises a primary wireless network and at least one secondary wireless networks, the primary and secondary wireless networks differing in at least one characteristic, at least one sensor unit comprising a means for sensing a parameter and a node of that secondary network adapted to transmit data relating to the parameter via that secondary network, at least one local data gathering point associated with the at least one secondary wireless network, incorporating a node of that secondary wireless network, a node of the primary network, and a control unit adapted to receive data signals from the at least one sensor unit via the secondary network, construct an outgoing data signal incorporating information from the received data signal, and transmit the outgoing data signal via the primary network, the primary wireless network being a multipoint radio network. The primary wireless network is optimized for relatively long distance communications, of the order of 10 kin, and the secondary network or networks are optimized for relatively short distance communications of the order of 100 m, the radio power of each network being different and appropriate for each transmission distance required. The nodes of the primary network may contain GPS receivers, to synchronize the sensors with which the nodes communicate, and aid routing performance of the primary wireless meshing network.

29 Claims, 5 Drawing Sheets

REMOTE AREA SENSOR SYSTEM

CROSS-REFERENCE TO RELATED APPLICATIONS

This Application is a Section 371 National Stage Application of International Application No. PCT/GB2007/000275, filed Jan. 26, 2007 and published as WO 2007/085850A1 on Aug. 2, 2007, the content of which is hereby incorporated by reference in its entirety.

FIELD OF THE INVENTION

The current invention relates to a remote area sensor system. It seeks to address the problems of transmitting sensor data from remote and potentially harsh environments such as oilfields, where there may be no mains power availability or telecommunications infrastructure.

BACKGROUND OF THE DISCLOSURE

The benefits of sensing parameters such as pressure, flowrate and temperature around a wellhead and associated flowlines and chokes are well known. Such sensors are routinely deployed in (for example) high value oil and gas wells, particularly offshore wells and land wells close to power and communications infrastructure.

However, a significant percentage of the world's oil and gas reserves are produced from wells completely remote from mains power or communications infrastructure. At present, such wells are largely unmonitored, or are only instrumented with mechanical gauges. They are visited occasionally by oil company personnel. The lack of real-time monitoring means that problems with the well can go unnoticed for some time, causing deferred or lost production. The lack of a reasonable quality database on the well means that reservoir analysis is hampered, and the reservoir reserves are more uncertain.

The desirability of real-time sensing even where there is no power or communications infrastructure is thus a highly specialised requirement applicable to oil and gas fields. In contrast, sensors deployed for industrial process control measurements have power available relatively close to the sensor, as industrial processes requires power, in contrast to a free flowing oil or gas well.

Various solutions have been proposed to monitor wells in remote oil and gas fields. Battery powered data loggers have been deployed that record measurements from time to time. This data can then be manually collected later. While providing a more regular electronic data record of the parameters associated with the well, the lack of real-time reporting is still a drawback along with the requirement to visit the wellsite at intervals for data collection.

Point to multi-point radio solutions have been implemented. In these systems the sensors around the wellsite are cabled to a wellsite radio transmitter. This transmitter then communicates with a remote central receiving station where the data is gathered for the field. The drawbacks of these systems are the cost and vulnerability of the wellsite cabling, and the lack of resilience and range of a point to multi-point radio system. Repeater stations may be deployed to increase range, but the lack of resilience of the system, and the requirement for careful configuration during installation remain.

Radio systems have also been deployed where each sensor incorporates a transmitter, hence eliminating the wellsite cabling. As the sensors are located close to the ground by the wellhead, the radio range of such sensors is limited. Typically such sensors communicate with a local wellsite receiver that then forwards the information on via satellite modem, GPRS modem, or a point to point radio system. Satellite and GPRS systems (when GPRS service is available) incur ongoing call charges that either substantially increase the running cost of the system, or force a very slow data collection rate to minimise call charges. Conventional radio systems incur the same problems of inflexibility, lack of resilience and requirement for field configuration that have already been mentioned.

SUMMARY

The present invention seeks to provide a communications system, embodiments of which are capable of wide area operation, are self powered, and provide real time communication of sensor data, and that are convenient to install in remote oilfield environments where no power or communications infrastructures are available.

Accordingly, a first aspect of the present invention provides an integrated sensor and wireless data transmission system comprising a primary wireless network and at least one secondary wireless networks, the primary and secondary wireless networks differing in at least one characteristic, at least one sensor unit comprising a means for sensing a parameter and a node of that secondary network adapted to transmit data relating to the parameter via that secondary network, at least one local data gathering point associated with the at least one secondary wireless network, incorporating a node of that secondary wireless network, a node of the primary network, and a control unit adapted to receive data signals from the at least one sensor unit via the secondary network, construct an outgoing data signal incorporating information from the received data signal, and transmit the outgoing data signal via the primary network, the primary wireless network being a multipoint radio network.

The outgoing data signal preferably includes the data of the received data signal together with at least a time stamp provided by the control unit.

The at least one local data gathering point can be arranged to receive instructions for the at least one sensor unit via the primary network and re-transmit the instructions to the at least one sensor unit via the secondary network. In this way, remote operation of the sensors is enabled.

The primary wireless network is optimised for relatively long distance communications, of the order of at least 10 km between nodes, and the secondary network or networks are optimised for relatively short distance communications of the order of 100 m, the radio power of each network being different and appropriate for each transmission distance required. This means that the secondary wireless network can have a restricted power output suitable for use proximate to wellheads, with the result that the useful range is less than that of the primary network and unlikely to be greater than 1 km. Typically, the useful range of the secondary network may be less than one tenth of that of the primary network.

The at least one sensor can be an oil or gas wellhead pressure sensor. It is preferably self powered such as by an internal battery or a solar cell. Ideally, it will switch off its secondary wireless network node when not in use, to conserve power.

The primary network can include other nodes that receive signals on the primary network and retransmit them to a further node of the primary network, but do not include a gateway or a node of the secondary network. These can in effect act as repeaters to extend the primary network or provide additional resilience.

The nodes of the primary network may contain a GPS receiver or other position sensing means such as the proposed Galileo system (hereinafter collectively referred to as "GPS"). The information obtained will have a number of uses. For example, the GPS timing information can be used to synchronise the sensors with which the nodes communicate, and the GPS location information can be shared with other primary wireless network nodes to aid routing performance of the primary wireless meshing network.

At least some of the nodes of the primary network are preferably self powered, such as by a battery or a source of solar power. The latter will preferably include a battery backup.

The primary network will generally be self-configuring and self-healing. This can provide the resilience that has hitherto been lacking.

It is also preferred that the node of the secondary wireless network is within the housing of the sensor. The sensor can also contain an internal data store in which sensor data is retained, to help during malfunction of the primary or secondary networks. This will enable stored data to be retrieved once the network functionality is restored, further adding to the resilience of the system. Older data may be deleted or overwritten to accommodate newer data, or after a period of time, for example if the storage capacity of the data store is limited.

Some primary network nodes may be located proximate to mains power and/or communications infrastructure. These points can therefore include a data storage means such as a computer, for retaining data prior to onward transmission or display. In general, there will be at least one such node that acts as an extraction point for the sensor data. This may be a control room from which the oilwells are monitored, or it may be an uplink to a satellite or other communication means.

The secondary networks can likewise be self-configuring and self-healing networks, often referred to as "meshing" networks. However, they can also be simpler star networks as they operate over a closer range.

BRIEF DESCRIPTION OF THE DRAWINGS

An embodiment of the present invention will now be described by way of example, with reference to the accompanying figures in which.

DETAILED DESCRIPTION OF ILLUSTRATIVE EMBODIMENTS

Figure 1:
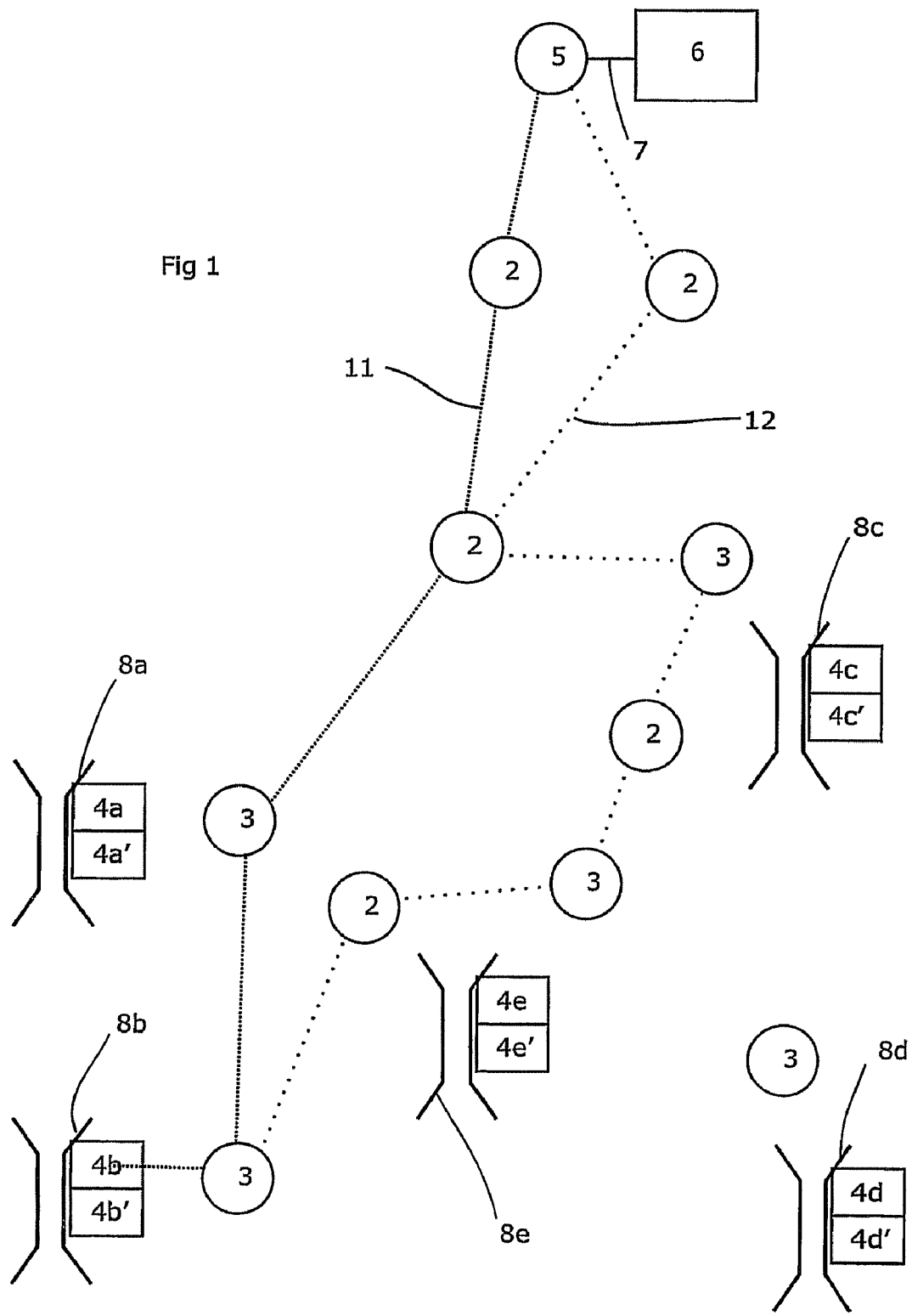
FIG. 1 is a diagrammatic representation of an oilfield and associated sensor and communication system.

Referring to FIG. 1, a plurality of oilwells 8a, 8b, 8c and 8d are fitted with self powered sensors 4a-4d'. A main data gathering point 6 is located remotely from the oilfield, in a location where mains power and telecommunications are available. The main data gathering point 6 is connected to a long range radio 5 via a cable 7. The long range radio 5 also receives power via cable 7. A plurality of self powered radios 2 operate on the same frequency and use the same network protocol and radio power level as long range radio 5. Self powered radios 2 contain a rechargeable battery and solar panel charging system, so that they do not require mains power. Gateway nodes 3 also contain the same long range radio type as long range radio 5 and self powered radios 2. Long range radio 5, self powered radios 2 and gateway nodes 3, together form a long distance communications mesh network that dynamically routes information for best performance using well known self-healing, self configuring mesh network principles.

The main data gathering point 6 is located in the oilfield control room. A display of real-time and historical data gathered from the remote area system is available in the control room for use by oilfield personnel. In addition, the data is made available over the oil company intranet so that offsite reservoir and production engineers can immediately monitor and use the information provided by the remote area system.

The long range radio 5, self powered radios 2 and gateway nodes 3 (long range nodes) each contain a GPS receiver, and hence each long range node can precisely determine its own location. It shares this information with the other long range nodes on the network. This self-acquired position information is used by the long range nodes to improve the routing of data within the long range network, as nodes closer to the data gathering point 6 are favoured for routing as compared to nodes that are further away.

The radios in the long range nodes are optimised for 10 km hops between each node, and consume about 1 W of transmitted power. This range dictates the maximum spacing between self powered radios 2 and gateway nodes 3 whereas the maximum distance from the oilwell to the main data gathering point 6 can be much further and is limited only by the number of such devices.

Self powered sensors 4a-4e' each contain a short range, very lower power radio with a transmit power of 1 mW and a useful range of about 100 m line-of-sight—generally at least an order of magnitude difference in power and/or range as compared to those of the primary network. Each gateway node 3 also contains a short range radio operating on a frequency different to that of the long range radio, and can act as a local data gathering point that collects data from the cluster of sensors near to it via a (local) secondary network and passes this to the primary network that is formed by the long range radio 5, self powered radios 2 and other gateway nodes 3.

The self powered sensor 4 also contains a small amount of non-volatile memory, and readings are stored within this memory as well as being transmitted. This memory allows for 2 months of data to be recorded at typical recording intervals. Once the memory is used up, the oldest data is overwritten, so that at any moment in time, the previous 2 months data is available. This data store can be particularly valuable in the event of a major natural event (blizzard, hurricane, earthquake etc.) that temporarily disrupts the remote area system. The data is automatically recovered over the remote area system to the data gathering point 6 once functionality is regained.

The path 11 for data from one particular self powered sensor 4b to the main data gathering point 6 is shown. This chooses a particular pattern of gateway nodes 3 and self powered radios 2. Another route such as route 12 would also work; in practice the precise route will be chosen ad hoc.

Figure 2:
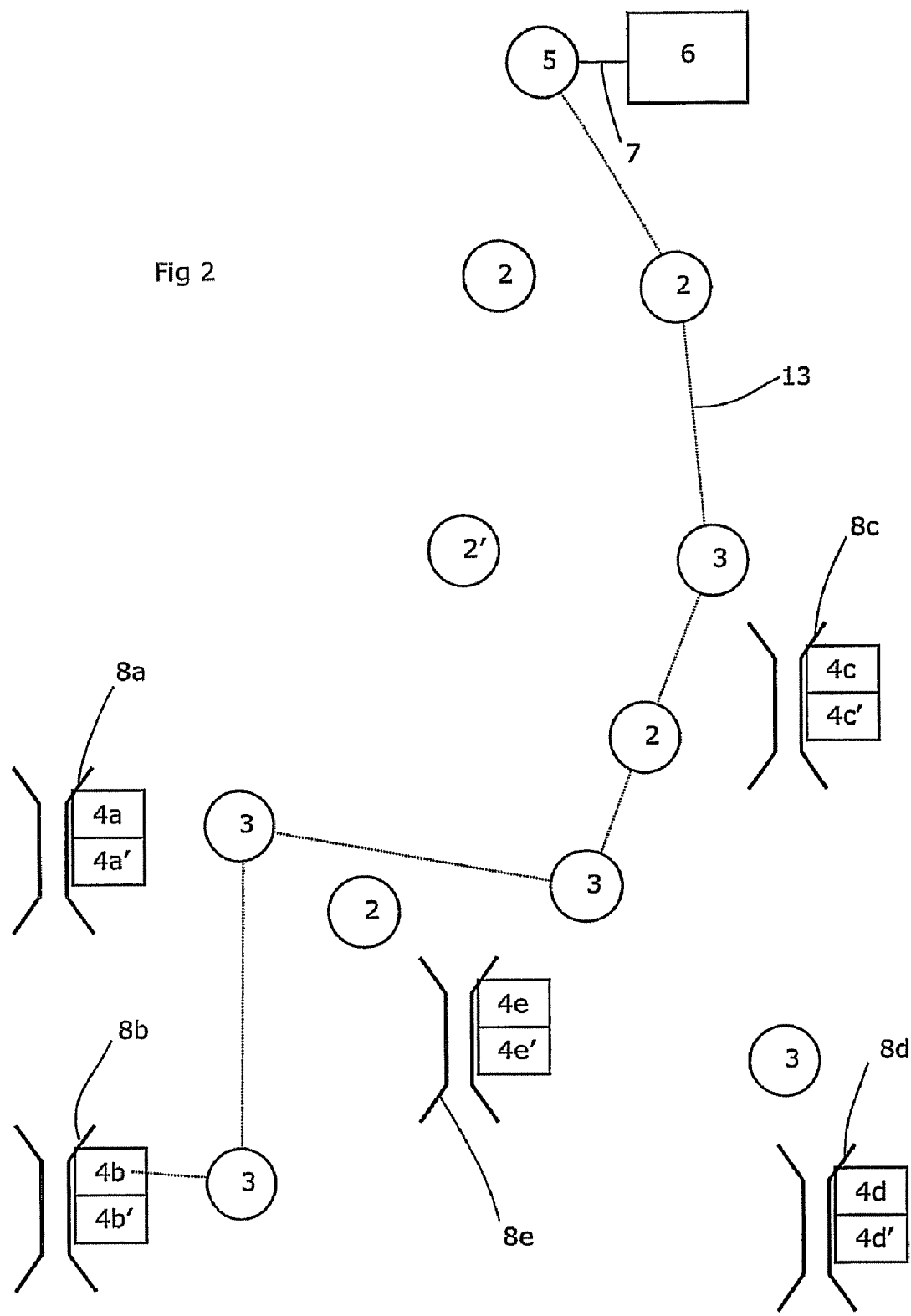
FIG. 2 shows a modified communication path.

FIG. 2 illustrates the self-healing nature of the long range radio network. In this example, one particular self powered radio 2' has failed, for example. The path 13 for data from the self powered sensor to the main data gathering point 6 is shown.

Figure 3:
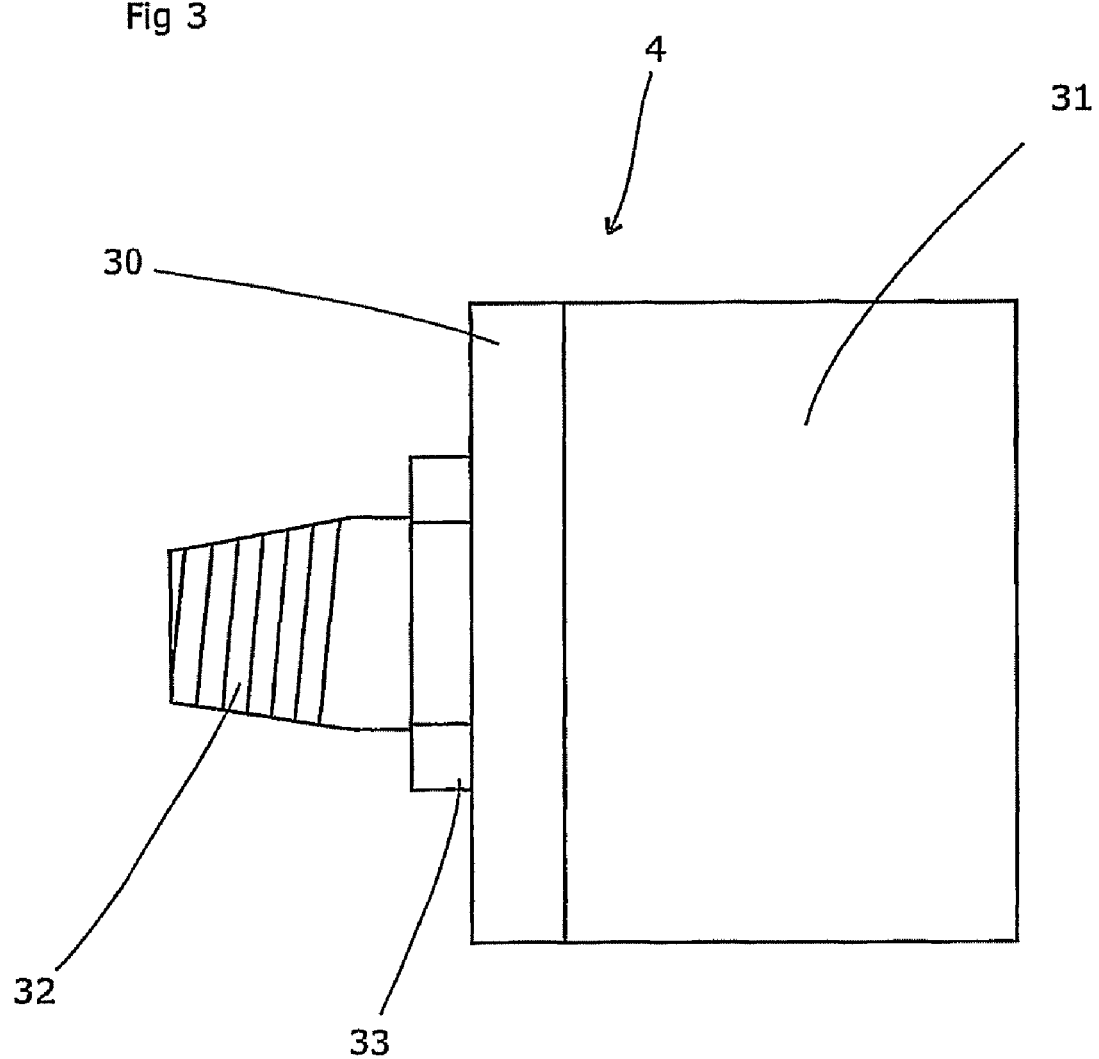
FIG. 3 shows a self powered sensor.

FIG. 3 shows one of the self powered sensors 4. A metal body 30 contains a pressure fitting 32 that allows the sensor to be screwed into a pressure fitting on the well 8 using a spanner on a hex formation 33. The metal body 30 contains a conventional strain gauge pressure transducer. A housing 31 is made in a material that is transparent to radio waves, so that the short range, low power radio contained inside is able to communicate through the housing 31. The housing 31 also contains a long life battery and conventional strain gauge signal conditioning electronics, together with power sequencing electronics. Typically, a pressure reading is taken every 30 seconds. Between readings, the strain gauge pressure transducer, signal conditioning electronics and short range radio are switched off to conserve battery life. The antenna for the short range radio is also contained within the housing 31. This provides a more rugged solution than an external antenna, and is less susceptible to wilful or accidental damage.

Figure 4:
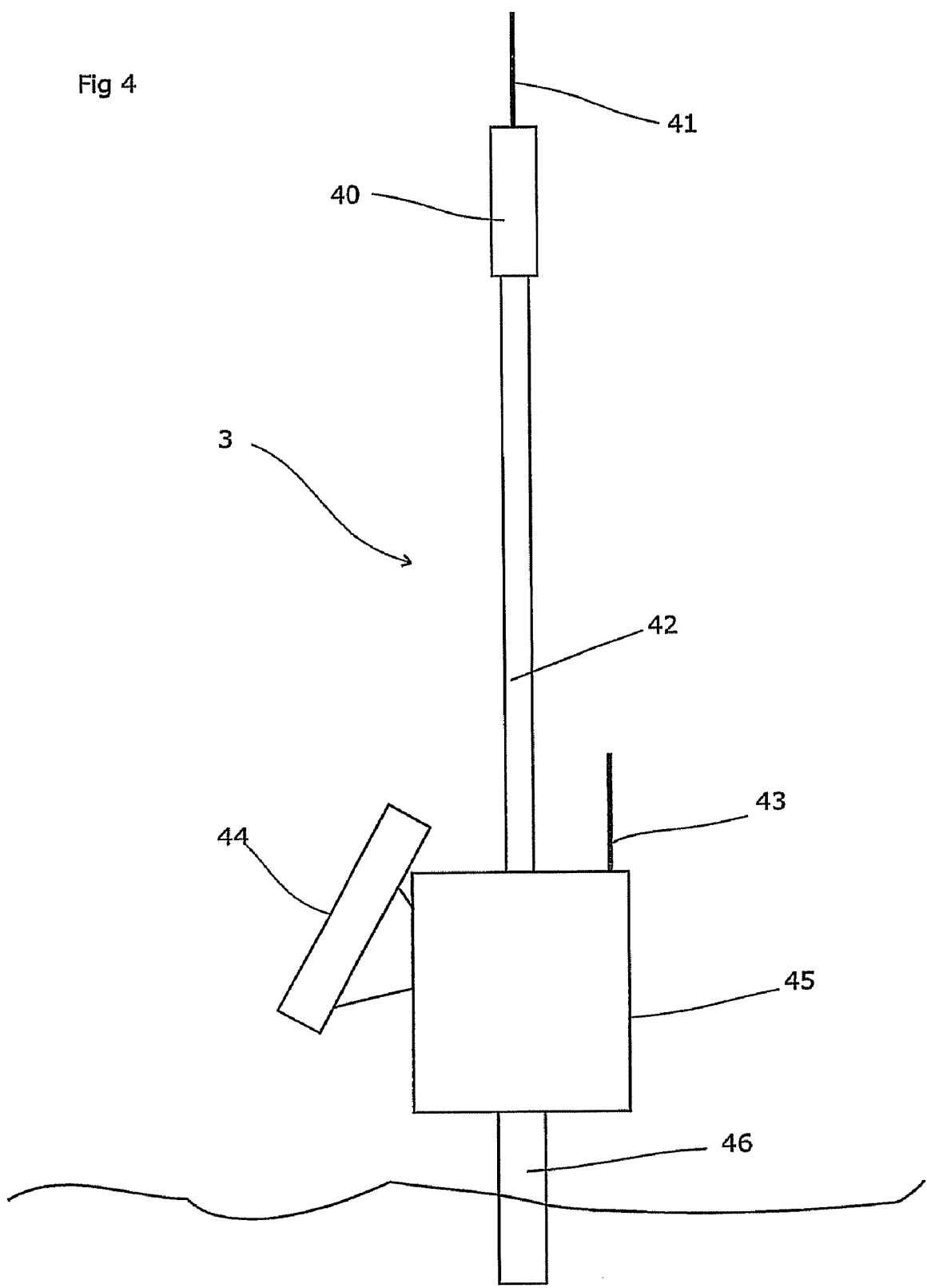
FIG. 4 shows a gateway node.

FIG. 4 shows a gateway node 3 in which a weatherproof enclosure 45 is mounted on a pedestal 46 set in a concrete foundation. A mast 42 elevates the long range radio 40 that transmits via a long range antenna 41. The enclosure 45 contains the necessary control functions to deal with the outputs of the sensors, and is shown in more detail in FIG. 5.

Figure 5:
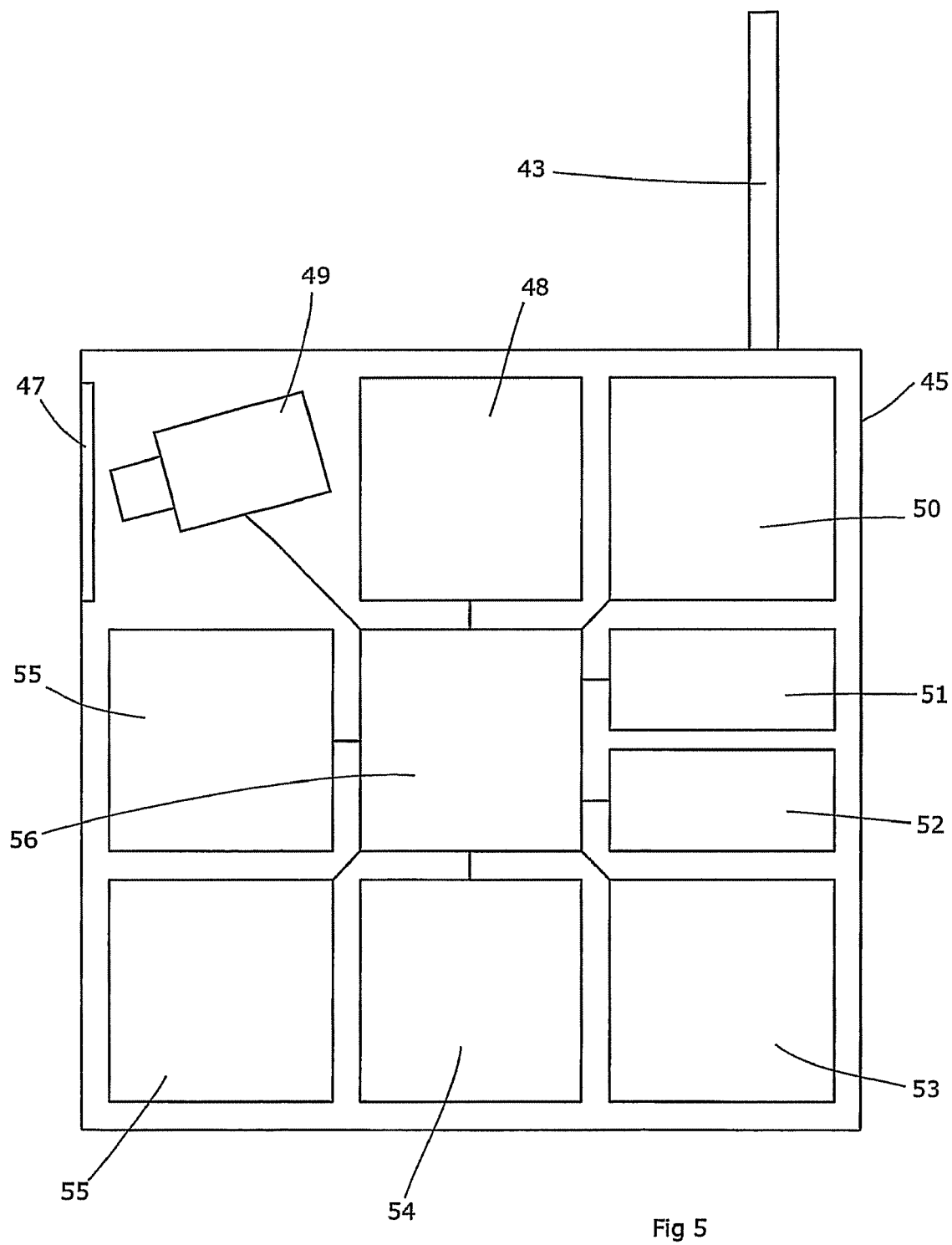
FIG. 5 shows the control unit of a gateway node.

Thus, the example of a suitable enclosure 45 shown schematically in FIG. 5 contains a rechargeable battery 53 that is recharged by a solar panel 44 (FIG. 4) during daylight hours. The enclosure 45 also contains a short range radio 50 that can communicate with any self powered sensors 4 that are in the immediate vicinity, via a short range antenna 43.

A controller 56 within the enclosure 45 co-ordinates the various items within the enclosure and carries out any necessary data processing. It is able to communicate with a location device 48 (e.g. GPS/Galileo etc), to give location data and also provide an accurate time synchronisation. The Controller also has one or more sensor interfaces 55 which enable it to link to very nearby sensors via a cable or other interface method. Such sensors might be within the enclosure (such as to monitor its own temperature) or external thereto but nearby. Wireless sensors in the general locality of the enclosure 45 are able to communicate with the controller 56 via the short range radio 50.

The controller 56 is responsible for timestamping measurements received from the sensors either via a sensor interface 55 or the short range radio 50. It is also arranged to control wireless and wired sensors via the radio 50 and antenna 43 or via the sensor interfaces 55. It therefore reads sensor information from the sensors prior to timestamping and forwarding, and also uses the timing information from the GPS system to accurately synchronise any sensors with which it communicates. For example, if the sample interval for any self powered sensor 4 is set to (say) 1 minute, the controller 56 will adjust the internal clocks within each sensor so that they are synchronised and therefore power up precisely on the 1 minute boundary (e.g. 2:34:00, 2:35:00, 2:36:00, as opposed to one at 2:34:05, 2:35:05, 2:36:05 and another at 2:34:25, 2:35:25, 2:36:25). Synchronising to GPS time across the oil field enables more accurate flowrate calculations along pipelines and across choke manifolds.

Other tasks for the controller 56 include the management of the solar charger 54 and monitoring the health of the battery 53. A keypad 52 is provided to allow a visiting user to input commands, together with a display 51 for outputting information. Alternatively, a connector for an external keypad or keyboard and for an external display can be provided, or an interface can be provided for a laptop or a dedicated interrogation device to be connected. Such connectors and interfaces are well known in the art.

The controller 56 can accept commands and report its status via the router 40. In preferred embodiments, this is a broadband radio router of (for example) the MOTOwi4 range of transmitters available from Motorola, Inc. Such routers are able to communicate with similar such routers within radio range as described above with reference to FIGS. 1 and 2, and these offer a resilient networking arrangement that can be made available in remote environments. In specific embodiments, it could be replaced by a GSM module or a satellite link, but these presuppose the availability of suitable network coverage.

The controller 56 also controls a camera 49 integrated within the enclosure 45. Still images can be captured on request, or according to a pre-programmed schedule, or on a periodic basis. These images can be sent as data items via the long range radio (or other) network. Alternatively, live video can be streamed or otherwise transmitted via the router 50. The camera 49 may be mounted external or internal to the enclosure 45, with a window 47 being provided in the enclosure wall when (as illustrated) the camera is internal. Alternatively, the video camera 49 could be located elsewhere, communicating with the controller 56 via the antenna 43 and the short range radio 50.

The controller 56 is also able to receive signals via the primary network that include control instructions for the elements that it controls. These control instructions are then forwarded to those elements via the secondary network or via any direct links between the elements and the controller 56. For example, the data sampling rate of sensors could be adjusted in this way, or the orientation of the camera (if adjustable) could be changed.

Of the above-described elements, the controller 56 is essential in that it is responsible for handling the data items being transmitted via the unit, but the other elements shown are each optional and could be omitted or replaced with other elements.

The antenna 43 is shown as being external to enclosure 45 but may of course be integrated within the enclosure 45 provided either that transmission through the enclosure walls is possible or a suitable transmission path through the wall is provided.

It will of course be understood that many variations may be made to the above-described embodiment without departing from the scope of the present invention.

The invention claimed is:

1. An integrated sensor and wireless data transmission system comprising;
   - a primary wireless network and at least one secondary wireless networks, the primary and secondary wireless networks differing in at least one characteristic,
   - at least one sensor unit comprising a means for sensing a parameter and a node of that secondary network adapted to transmit data relating to the parameter via that secondary network and in which the at least one sensor unit is adapted to switch off the secondary wireless network node when not in use;
   - at least one local data gathering point associated with the at least one secondary wireless network, incorporating;
     - the node of the secondary wireless network,
     - a node of the primary network, and
     - a control unit adapted to receive data signals from the at least one sensor unit via the secondary network, construct an outgoing data signal incorporating information from the received data signal, and transmit the outgoing data signal via the primary network;
   - the primary wireless network being a multipoint radio network.

2. The integrated sensor and wireless data transmission system according to claim 1 in which the outgoing data signal includes the data of the received data signal together with at least a time stamp.

3. The integrated sensor and wireless data transmission system according to claim 1 in which the at least one local data gathering point is arranged to receive instructions for the at least one sensor unit via the primary network and retransmit the instructions to the at least one sensor unit via the secondary network.

4. The integrated sensor and wireless data transmission system according to claim 1 in which the primary wireless network has a range of at least 10 km.

5. The integrated sensor and wireless data transmission system according to claim 1 in which the at least one secondary network has a useful range of approximately 100 m.

6. The integrated sensor and wireless data transmission system according to claim 1 in which the primary wireless network has a range of at least ten times the range of the at least one secondary network.

7. The integrated sensor and wireless data transmission system according to claim 1 in which the at least one secondary network has radio power and the radio power of the at least one secondary network is limited to provide a maximum range of 1 km.

8. The integrated sensor and wireless data transmission system according to claim 1 in which the at least one sensor is an oil or gas wellhead pressure sensor.

9. The integrated sensor and wireless data transmission system according to claim 1 in which the at least one sensor is self powered.

10. The integrated sensor and wireless data transmission system according to claim 9, in which the at least one sensor is powered by an internal battery.

11. The integrated sensor and wireless data transmission system according to claim 9, in which the at least one sensor is powered by a solar cell.

12. The integrated sensor and wireless data transmission system according to claim 11 in which the at least one sensor has a battery back-up for the solar power source.

13. The integrated sensor and wireless data transmission system according to claim 1 in which the at least one sensor is a video camera.

14. The integrated sensor and wireless data transmission system according to claim 1 in which the local data gathering point includes a video camera communicating with the control unit.

15. The integrated sensor and wireless data transmission system according to claim 1 in which the node of the primary network contains GPS receivers.

16. The integrated sensor and wireless data transmission system according to claim 15 in which the node of the primary network uses GPS timing information to synchronise sensors with which they communicate.

17. The integrated sensor and wireless data transmission system according to claim 15 in which the nodes of the primary network retains location information and shares this information with other nodes of the primary network to aid routing performance of the primary wireless meshing network.

18. The integrated sensor and wireless data transmission system according to claim 17 in which the node of the primary network obtains the location information from the GPS receiver.

19. The integrated sensor and wireless data transmission system according to claim 1 in which the one or more nodes of the primary network are self powered.

20. The integrated sensor and wireless data transmission system according to claim 19 in which the one or more node of the primary network are battery powered.

21. The integrated sensor and wireless data transmission system according to claim 19 in which the one or more nodes of the primary network are solar powered.

22. The integrated sensor and wireless data transmission system according to claim 21 in which the one or more nodes of the primary network have a battery back-up for the solar power source.

23. The integrated sensor and wireless data transmission system according to claim 1 in which the primary network is self-configuring.

24. The integrated sensor and wireless data transmission system according to claim 1 comprising a housing of the sensor in which the node of the secondary wireless network is within the housing of the sensor.

25. The integrated sensor and wireless data transmission system according to claim 24 in which the housing of the sensor encloses an aerial of the node of the secondary wireless network.

26. The integrated sensor and wireless data transmission system according to claim 1 in which the sensor contains an internal data store in which sensor data is retained.

27. The integrated sensor and wireless data transmission system according to claim 1 in which a main data gathering point is located proximate to one of mains power and communications infrastructure.

28. The integrated sensor and wireless data transmission system according to claim 27 in which the main data gathering point includes a data storage means for retaining data prior to onward transmission or display.

29. The integrated sensor and wireless data transmission system according to claim 1 in which the characteristic that differs as between the primary and secondary wireless networks is the signal frequency.

* * * * *